US006754779B1

(12) United States Patent
Magro

(10) Patent No.: US 6,754,779 B1
(45) Date of Patent: Jun. 22, 2004

(54) SDRAM READ PREFETCH FROM MULTIPLE MASTER DEVICES

(75) Inventor: James R. Magro, Austin, TX (US)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/378,870

(22) Filed: Aug. 23, 1999

(51) Int. Cl.[7] ............................................. G06F 12/00
(52) U.S. Cl. ..................... 711/137; 711/173; 711/105; 710/22
(58) Field of Search .............................. 711/137, 213, 711/105, 146, 163, 173, 129; 710/110, 22, 28; 365/230.04

(56) References Cited

U.S. PATENT DOCUMENTS

| | | | | |
|---|---|---|---|---|
| 3,820,079 A | * | 6/1974 | Bergh et al. | 710/112 |
| 4,918,587 A | * | 4/1990 | Pechter et al. | 711/218 |
| 5,293,609 A | * | 3/1994 | Shih et al. | 711/137 |
| 5,499,355 A | * | 3/1996 | Krishnamohan et al. | 711/137 |
| 5,530,941 A | * | 6/1996 | Weisser et al. | 711/151 |
| 5,708,794 A | * | 1/1998 | Parks et al. | 711/154 |
| 5,721,865 A | * | 2/1998 | Shintani et al. | 712/207 |
| 5,778,436 A | * | 7/1998 | Kedem et al. | 711/137 |
| 5,859,649 A | * | 1/1999 | Yiu et al. | 345/560 |
| 5,983,321 A | * | 11/1999 | Tran et al. | 711/125 |
| 5,996,061 A | * | 11/1999 | Lopez-Aguado et al. | 712/207 |
| 6,021,468 A | * | 2/2000 | Arimilli et al. | 711/122 |
| 6,049,851 A | * | 4/2000 | Bryg et al. | 711/141 |

OTHER PUBLICATIONS

*Am486™DX/DX2 Microprocessor Hardware Reference Manual*, Advanced Micro Devices, Inc., Rev. 1 1993, cover page, table of contents, pp. 7–9 through 7–35.
*PCI Local Bus Specification*, PCI Special Interest Group, ©1998, Rev. 2.2, table of contents, and pp. 21 through 25.

* cited by examiner

*Primary Examiner*—Matthew Kim
*Assistant Examiner*—Matthew D. Anderson
(74) *Attorney, Agent, or Firm*—Akin Gump Strauss Hauer & Feld LLP

(57) ABSTRACT

Improved performance for data read operation is achieved in a read buffer that receives and stores requested information in response to read requests from multiple requesting master devices. A full cache line of data is read from the memory device into the read buffer in response to any read request. The requested data and any additional data within the retrieved cache line is available to any requesting master device in zero wait states. In addition, a next cache line of data is retrieved concurrently while the previously stored data is provided to the requesting master pursuant to the original read request. Subsequent read requests that matches any data stored in the read buffer is provided pursuant to a subsequent read request in zero wait states.

18 Claims, 10 Drawing Sheets

Figure 9 Address Store

SDRAM READ PREFETCH FROM MULTIPLE MASTER DEVICES

STATEMENT REGARDING FEDERALLY SPONSORED RESEARCH

Not applicable.

BACKGROUND OF THE INVENTION

1. Field of the Invention

The invention relates to a memory buffer architecture, and more particularly to memory read operations with prefetching to a buffer.

2. Description of the Related Art

Many systems contain random access memory, or RAM, to provide temporary storage of data when a system is powered up. A source within the system, often known as a master, will typically read from the RAM or write to the RAM. To illustrate, a processor in a system may be a master. Because a master controls the bus which connects between the master and the RAM to access the RAM, the master is also commonly known as a bus owner or bus master during the time. Also found in many systems is an interface to the memory, or RAM, known as a RAM controller. So, for example, in a system using dynamic RAM, or DRAM, a DRAM controller may interface between the master and the DRAM itself.

In addition, DRAM controllers have been provided which operate at a different frequency than the master device. Along with presenting various timing issues, setup/hold time issues for example, the different operating frequencies require the faster device to experience inefficient time out periods or idle states. For example, a DRAM controller that is operating at a higher frequency than the CPU, may need to sit idle during some CPU clock cycles so that the CPU read operations can catch up. These wait states have been avoided by using a variety of techniques, including page-mode memory, interleaved memory, burst modes, and memory caches.

There are a number of techniques for implementing burst modes. In a data bus, for example, a burst mode usually is implemented by allowing a device to seize control of the bus and not permitting other devices to interrupt. In a CPU, burst mode operation has been implemented by blindly retrieving memory data in addition to the data immediately requested. The additional memory data is then stored within CPU local memory for reading at a later time.

SUMMARY OF THE INVENTION

The computer system provides improved performance for data operations. A memory controller having a read buffer that receives and stores request information is provided between multiple requesting master devices and a memory device. The read buffer is capable of operation in either a demand read mode or a prefetch read mode. In the demand mode, the read buffer immediately forwards data to the requesting master. A full cache line of data containing the requested data is concurrently stored in the read buffer such that subsequent read requests from the same or other requesting devices that matches either the previously requested data or data within the stored cache line of data in the read buffer is supplied to the requesting master in zero wait states. Read prefetch is supported by receiving and storing additional data from memory. The prefetch data is retrieved without an immediate need for that data. Performance of read operations is increased in that any subsequent read request matching either the previously demanded data or the prefetched data causes the matching data to be provided to the requesting master in zero wait states without additional memory access.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

The following related patent applications are hereby incorporated by reference as if set forth in their entirety:

U.S. patent application, Ser. No. 09/378,870 entitled SDRAM/CPU CLOCK SYNCHRONIZATION SCHEME, filed concurrently;

U.S. patent application, Ser. No. 09/379,457 entitled FLEXIBLE MICROCONTROLLER ARCHITECTURE, filed concurrently.

The illustrative system described in this patent application provides a technique for determining the source of memory reads in a system which contains multiple masters. For purposes of explanation, specific embodiments are set forth to provide a thorough understanding of the illustrative system. However, it will be understood by one skilled in the art, from reading the disclosure, that the technique may be practiced without these details. Further, although the embodiments are described in terms of a microcontroller architecture, it should be understood that this embodiment is illustrative and is not meant in any way to limit the practice of the disclosed system to microcontroller systems. Also, the use of the terms SDRAM and SDRAM controllers to illustrate how the system works is not intended to infer that the illustrative system requires a specific type of memory. Rather, any of a variety of memory types may be employed in practicing the technique described herein. Moreover, well-known elements, devices, process steps, and the like, are not set forth in detail in order to avoid obscuring the disclosed system.

Microcontroller

Figure 1:
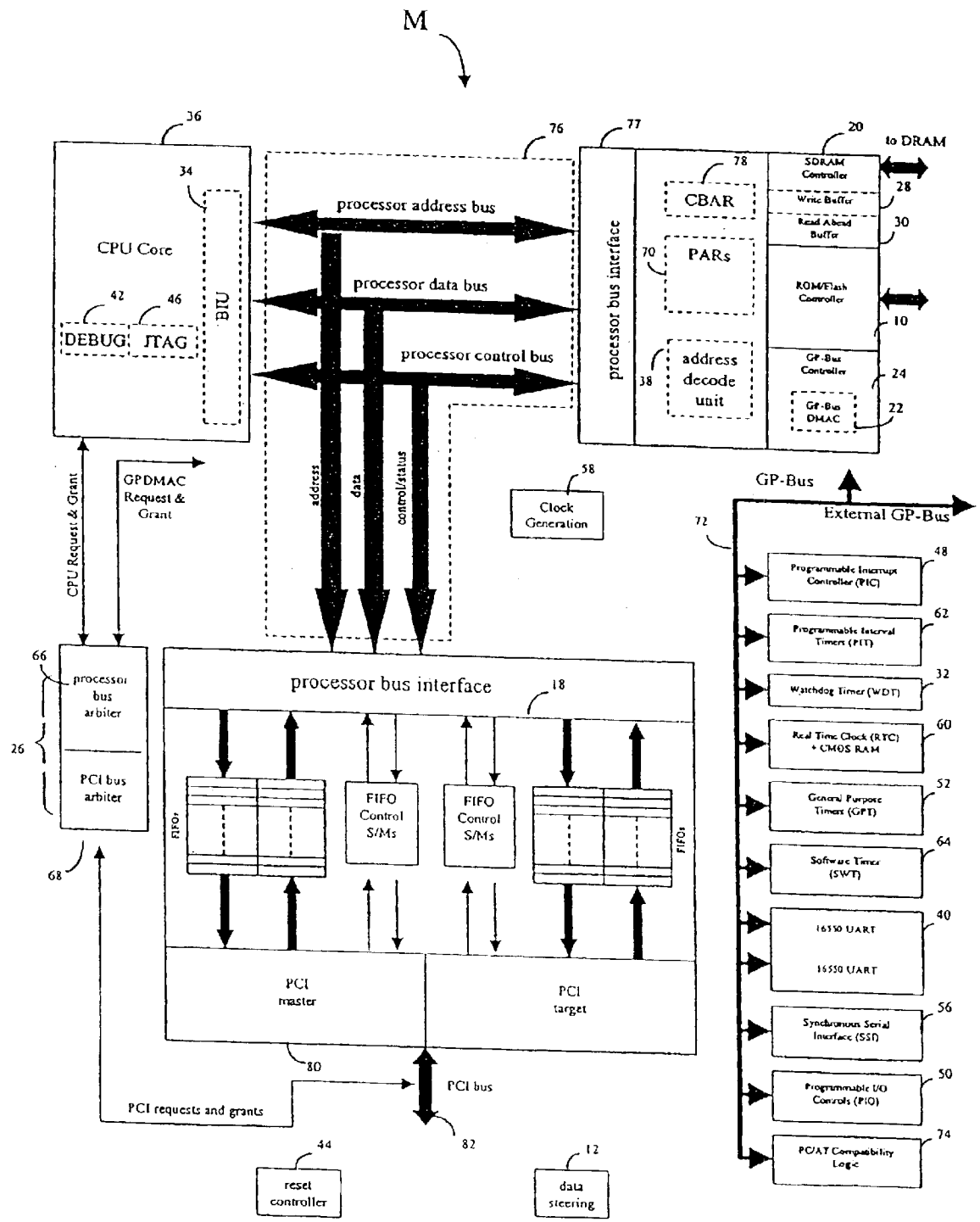
FIG. 1 is a block diagram of an exemplary microcontroller.

Turning now to the drawings, FIG. 1 shows a typical microcontroller M in accordance with the present invention.

The microcontroller M provides a highly integrated CPU 36 with a complete set of peripherals that are superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address spate and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a synchronous dynamic random access memory (S DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36. The memory space and I/O space of the PCI bus 82 are accessible by the CPU 36, the PCI master controller 80, and external PCI bus masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMAC 22 and the PCI host bridge 18 on behalf of an external PCI master going to SDRAM. The PCI bus arbiter 68 may arbitrate between five possible PCI masters.

A processor bus interface BIU 34 is responsible for DMA cache snooping, dynamic clock speed adjusting, dynamic bus sizing, ready signal consolidation. Memory Mapped Configuration Region (MMCR) control, and general purpose address control is performed by ADU 38. The BIU 34 basically assists the CPU 36 with bus, DMA, and memory control.

A clocks module 58 provides oscillators and phase locked loops (PLLs) to support the SDRAM controller 20, UARTs 40, general purpose timers (GPT) 52, and a real-time clock (RTC) 60.

The SDRAM controller 20 provides SDRAM (synchronous SDRAM) support, symmetric and asymmetrical SDRAM support, SDRAM auto refresh support, SDRAM Error Correction Code (ECC) support, SDRAM write buffering support, SDRAM read pre-fetching support, read-around-write support, and support for up to 256 megabytes of SDRAM. The SDRAM controller 20 may service requests from the CPU 36, the PCI host bridge on behalf of a PCI master, or the general purpose bus DMA controller and may issue commands to SDRAM devices 116. SDRAM cycles may be also be initiated by a write buffer 28 or a read-ahead buffer 30 internal to the SDRAM controller 20. The write buffer 28 and the read-ahead buffer 30 together provide buffering techniques to optimize SDRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and SDRAM. Features of the controller 22 includes support for up to 7 DMA request channels (with a maximum of 4 external requests), support for three 16-bit channels and four 8-bit channels, buffer chaining capability in enhanced mode, fly-by transfers between general purpose bus peripherals and SDRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller SDRAM space. The PCI Host bridge 18 may be a 33 MHz, 32-bit PCI Bus Revision 2.2-compliant host bridge interface.

A PIC 48 includes 3 industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The PIC 48 includes a router that may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second timeout with a 33 MHz CPU clock.

The PC/AT compatibility logic 74 provides PC/AT-compatible functions. The PC/AT compatible integrated peripherals include the DMA controller 22, the PIT 62, the PIC 48, the GPT 52, the UARTs 40, and the RTC 60.

Read Prefetch

Figure 2:
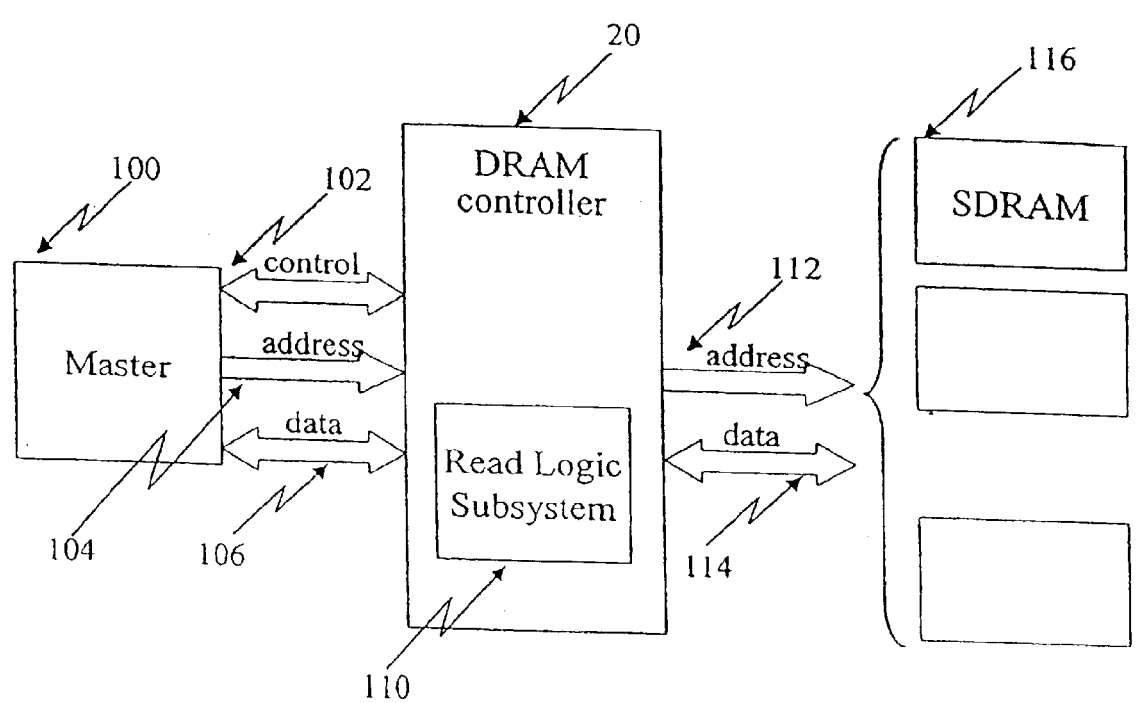
FIG. 2 is a simplified block diagram illustrating an exemplary read scheme for the DRAM controller of FIG. 1.

Referring now to FIG. 2, shown is a simplified block diagram illustrating the relationship between a master device 100, the SDRAM controller 20, including a read logic subsystem 110, and a multiple number of SDRAM memory devices 116. Specifically, data from the SDRAM devices 116 is read through memory accesses as requested by the master device 100 over internal control, address and data buses 102, 104, 106, 112 and 114. The SDRAM controller 20 acts as an intermediary between the master device 100 and the SDRAM memory devices 116 and provides control for their communication. Specifically, the SDRAM controller 20 includes the read logic subsystem 110 which provides a mechanism by which the master device 100 reads data that is transmitted from the SDRAM devices 116.

Although the SDRAM controller 20 is described as part of the microcontroller M for exemplary purposes, it should be understood that the SDRAM controller 20 may be provided as a discrete circuit, such as an ASIC. In addition, although the SDRAM controller 20 is described as providing memory data over an internal bus for exemplary purposes, it should be understood that the SDRAM controller 20 may also provide access to any standard peripheral bus, such as a PCI bus.

Figure 3:
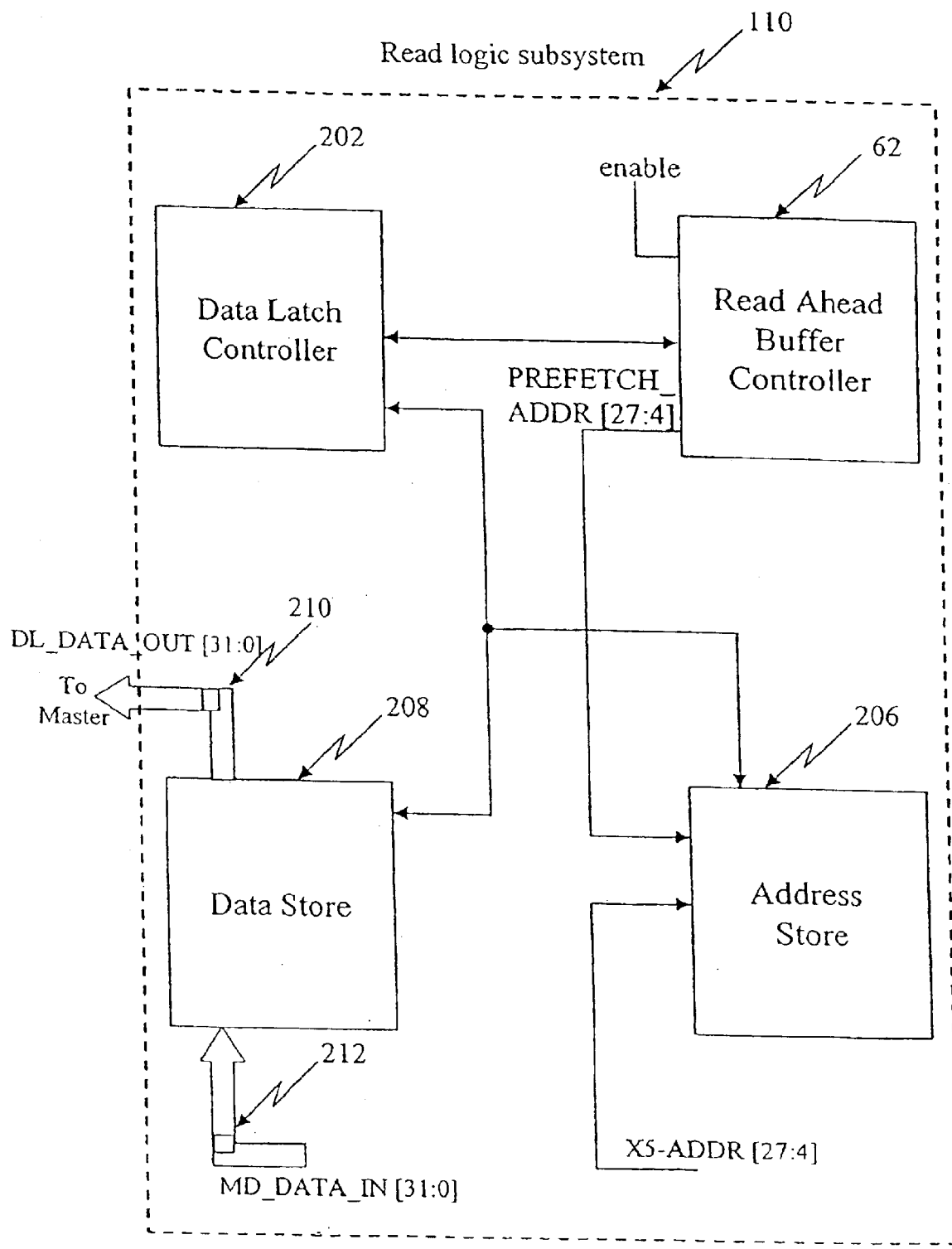
FIG. 3 is a block diagram illustrating in more detail the read logic subsystem of FIG. 2.

Turning now to FIG. 3, shown is a more detailed block diagram of the components of the read logic subsystem 110. Specifically, the read logic subsystem 110 includes four function blocks. The data store 208 provides storage for the data that is returned from the SDRAM devices 116 over the MD_DATAIN [31:0] bus 212. Outgoing data is sent from the data store 208 to the requesting master device over the DL_DATAOUT [31:0] bus 210. The data store 208 is discussed in greater detail in connection with FIG. 6. The address store 206 stores the address of the data returned from the SDRAM devices 116. The address store 206 is discussed in greater detail in connection with FIG. 9. The data latch controller 202 manages the data store 208 and the address store 206 as well as read operations during normal demand read requests (described in more detail below). The data latch controller 202 is discussed in greater detail in connection with FIG. 8. The read ahead buffer controller 62, when enabled, provides a mechanism to prefetch a next cache line of information from the SDRAM devices 116 in anticipation of future accesses to the prefetched data.

As shown in FIG. 3, the read ahead buffer controller 62 exists within the same module as the rest of the read logic components. The read ahead buffer controller 62 is tightly integrated with the data latch 202, the address store 206 and the data store 208. Specifically, the read ahead buffer controller 62, when enabled, provides a mechanism to read additional data that was not specifically requested by a master device into the data store 208 such that subsequent read requests that match the prefetched data will be provided to any subsequent requesting master in reduced (preferably zero) wait states. A more detailed account of the prefetch function follows in connection with FIGS. 4 and 7.

Figure 4:
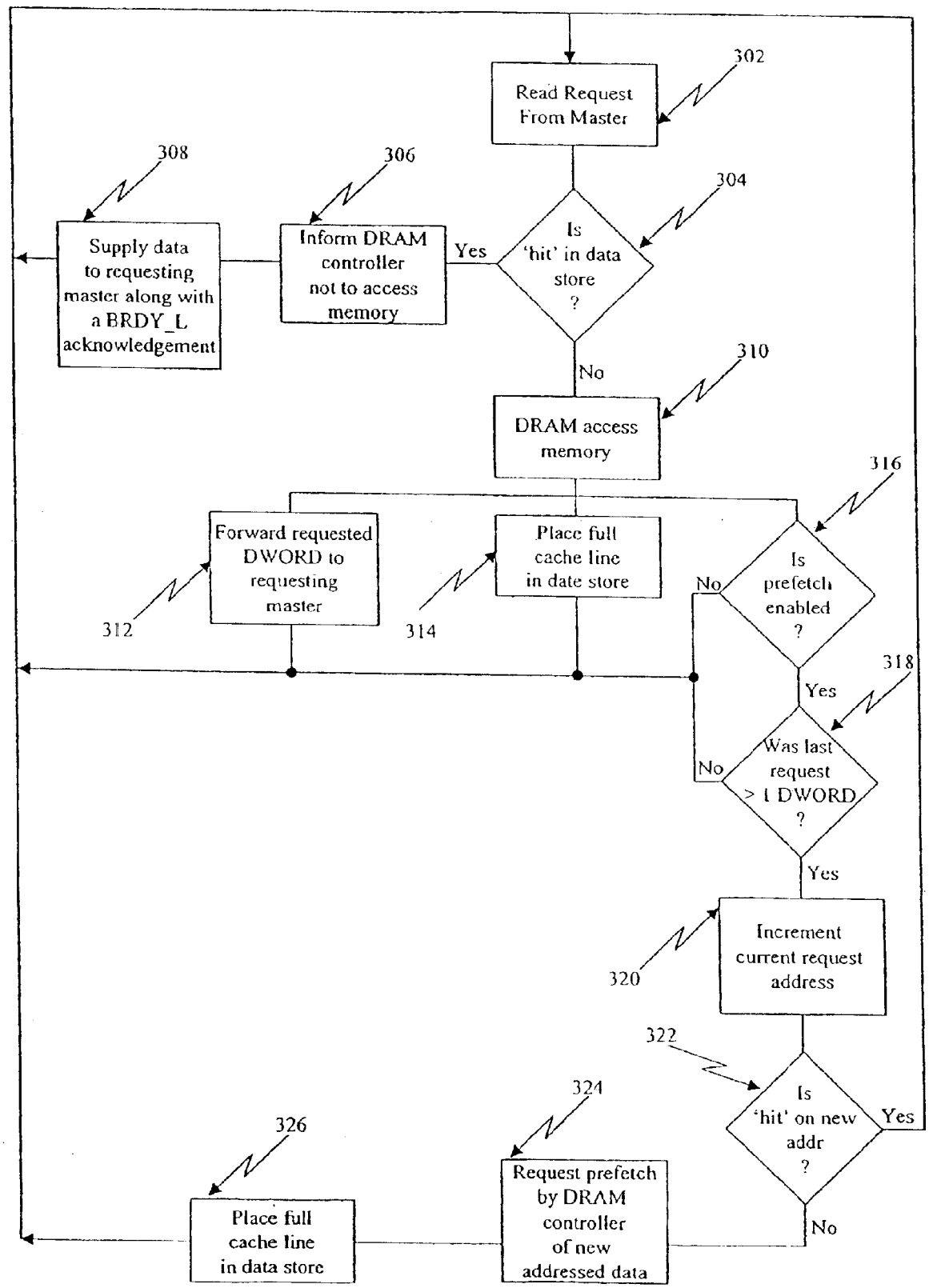
FIG. 4 is a flow diagram illustrating an exemplary memory read scheme for the DRAM controller FIG. 1.

A general description of the demand read function and the read prefetch function according to the disclosed embodiment is shown in connection to FIG. 4. FIG. 4 is a flow diagram illustrating the disclosed embodiment for data returned from the SDRAM devices 116 and read by the requesting master device in response to either a demand request or a prefetch read request. The flow diagram and the steps described in connection with the flow diagram may be implemented in any number of ways known to the art with departing from the disclosed invention, such as through a "program" in software alone or by circuitry with ASIC code.

A demand request is a direct request of data by either the CPU 36, the PCI host bridge 18 on behalf of a PCI master connected to the PCI bus 82 or the GP-bus controller 24 (or some other master). In response to a demand request, the specific requested DWORD is fetched from the SDRAM devices 116 and immediately forwarded to the requesting master. A standard read cycle, without the benefit of the disclosed memory read, does not start a subsequent read while a previous read is still in progress because the master has no way to give the next address that it is going to request while the current cycle is in progress. In that case, a full cache line of data may take up to four distinct read requests, over four master read cycles. This would occur where each read request is for one DWORD only (a full cache line contains four DWORDs). However, to take advantage of the SDRAM controller 20 idle time within the slower CPU read cycle, a full cache line of data is retrieved from the memory device even where the read request requests less than a full cache line of data.

An entire cache line is stored in the read logic subsystem 110 while the read request is satisfied to the requesting master. Read performance is improved by retrieving and storing additional DWORDs and providing the stored information to any requesting master upon a subsequent read request in zero wait states. Specifically, because information that matches the subsequent read request has been stored within the read logic subsystem 110, during a previous clock cycle, direct access to the memory devices to satisfy a subsequent request is unnecessary. Instead the subsequent read request is satisfied with the matching information already in the read logic subsystem 110.

A prefetch read request occurs where an additional cache line of data is read from the SDRAM devices 116 by the SDRAM controller 20 without an immediate need for the prefetched data. This prefetched data is then stored in the data store 208 within the read logic subsystem 110. When prefetching is enabled, the read logic subsystem 110 instructs the SDRAM controller 20 to prefetch the next full cache line of data from the last read of data. The read prefetch occurs (if qualified by a read prefetch enable and a master read access of greater than one DWORD, discussed in detail below) following the original master access to SDRAM. Because the SDRAM controller 20 and the SDRAM memory devices 116 operate at a higher frequency, the SDRAM controller 20 normally, without the benefit of the disclosed memory used, would wait to perform a subsequent retrieve of additional memory data until the next master read cycle. By enabling a read prefetch operation, otherwise idle time of the SDRAM controller 20 within the slower CPU read cycle is utilized by prefetching the next full cache line of memory data prior to an actual read request for the data. The prefetch data is centrally stored within the read logic subsystem 110 for access by any requesting master within the microcontroller M. Because the prefetched data is stored locally, stored data matching a subsequent read request is provided to the requesting master in reduced, or zero wait states.

Turning now to FIG. 4, a read cycle is initiated by a read request from a master device 100 at step 302. If the address of the read request matches the address of data found in the data store 208, a 'hit' occurs at step 304. This will typically be the case after an initial demand request because most processors burst a series of data items in a read. A read request that hits the data in the data store 208 causes the data in the data store to be immediately supplied to the requesting master device 100. Providing data immediately (and locally) avoids the need to impose intervening wait states to compensate for delays encountered in accessing the memory devices 116 themselves. Continuing, at step 306 the read logic subsystem 110 recognizes that a 'hit' has occurred for data already present in the data store 208. The SDRAM controller 20 is instructed not to access memory. Instead, at step 308, the hit data in the data store 208 is presented to a master device 100 on the DL_DATA_OUT [31:0] bus 210. At this point, an active BRDY_L is supplied back to the master informing that a read request has been satisfied and the read logic subsystem 110 then waits for subsequent read requests back at step 302.

If at step 304, a hit does not occur on data in the data store 208, the SDRAM controller 20 is instructed by the read logic subsystem 110 to access the SDRAM devices 116 directly to satisfy the read request. At this point, the read logic subsystem 110 function branches to perform three concurrent tasks. At step 312, the requested DWORD, identified by the original read request, is presented immediately to the requesting master device 100. At the same time, at step 314, that requested DWORD and the remaining cache line that is read from SDRAM devices 116 is concurrently stored in the data store 208. A full cache line of data is always read from the SDRAM device 116 during a master read request and stored in the data store 208. Steps 312 and 314 always occur in response to a normal demand request.

If enabled, at the same time in step 316, the read logic subsystem 110 will institute a read prefetch operation. However, a read prefetch will not occur unless the original read request or access at steps 302 and 310, respectively, was for at least two DWORDs. Single DWORD read requests will not result in read ahead prefetch and will only result in the cache line of demanded access to be read into the data store. At step 318, if the original request was at least two DWORDs, the read ahead buffer controller 62 increments, at step 320, the address of the original read request to generate the read prefetch address for the next cache line of data. At step 322, it is determined whether a hit has occurred in the data store for this new address. If yes, then the prefetch operation is halted and the system returns to step 302 where it waits for a new read request from the master device 100. If a hit occurs at step 322, it means that the data to be read in response to the prefetch read request already exists in the data store 208. Thus the prefetch operation is halted to avoid duplicative memory accesses. However, if the data to be read in response to the prefetch read request is not in the data store 208, then at step 324 the read ahead buffer controller 62 initiates a request to the SDRAM controller 20 to prefetch the newly addressed data from the SDRAM devices 116. As with all reads of the SDRAM devices 116, a full cache line of data is read. At step 326, the retrieved cache line is then placed into the data store 208 in anticipation that the requesting master device or some other master device will access this following (forward) cache line of information on subsequent read cycles. In that instance, the data is supplied to the requesting master device immediately, avoiding unneeded and time consuming accesses to the SDRAM devices 116 directly.

Figure 5:
FIG. 5 is a table signaling information for read logic subsystem of FIG. 2.

Turning now to FIG. 5, shown is a table describing some of the control, data, and addressing signals utilized within the read logic subsystem 110 and between the master device 100, the SDRAM controller 20 and the SDRAM devices 116. The table 400 is intended as a reference and the signals it describes are discussed in greater detail in connection with FIGS. 6 through 9.

Figure 6A:
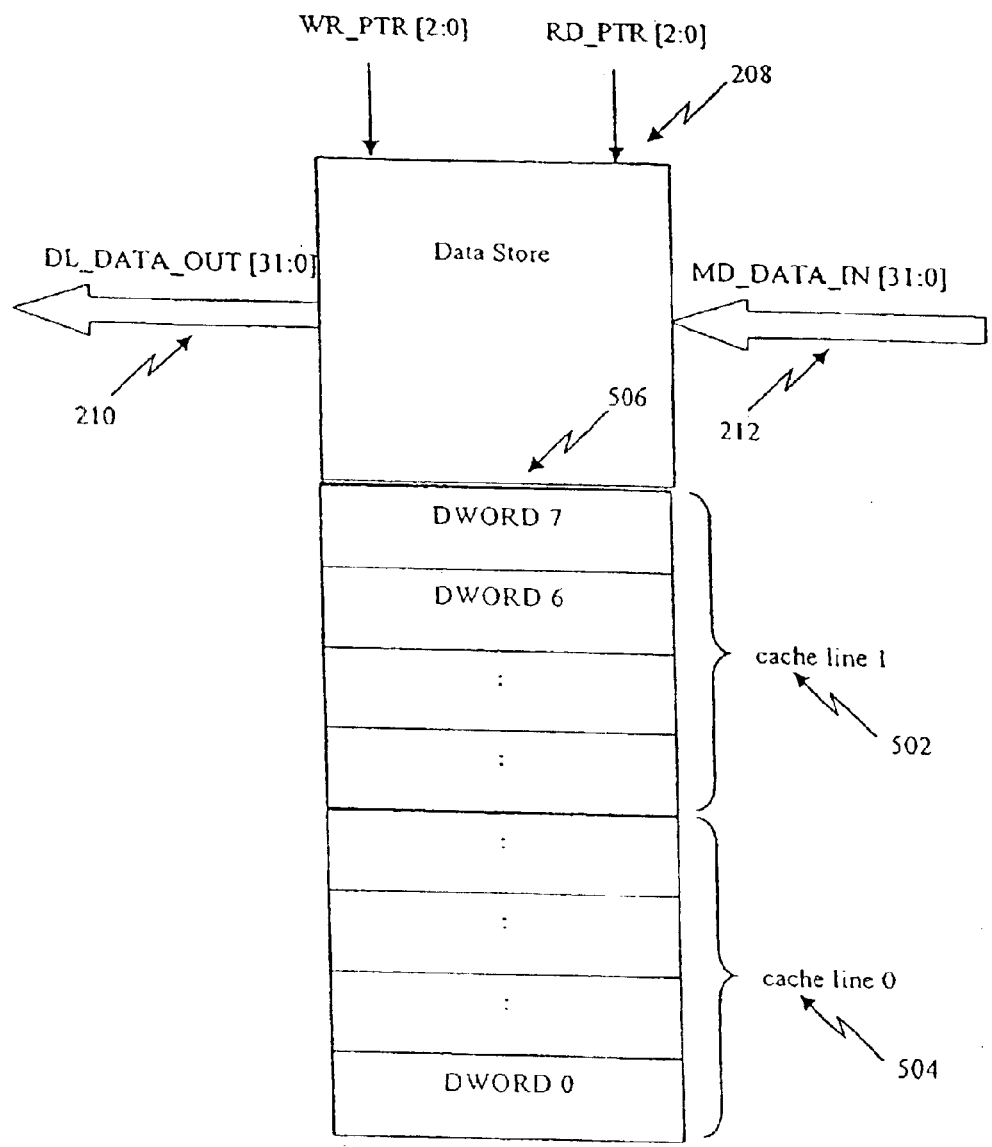
FIGS. 6a and 6b are block diagrams illustrating in more detail the data store and its contents of FIG. 3.

Turning to FIG. 6a, shown is a more detailed illustration of the data store 208. The data store 208, according to the disclosed embodiment, is a dual port SRAM, as is well known in the memory architecture and microcomputing industries, organized as a single 32 bit wide storage array of eight ranks deep (total of eight DWORD capacity or 32 bytes). The data store is separated into two rank partitions (four DWORDS in each partition) each of which holds a cache line of data, one partition pertaining to the lower four physical addresses 504 and the other partition pertaining to the upper four physical addresses 502. The data is addressed by a set of control signals. According to the disclosed embodiment, the two data partitions are alternatively filled, such that one segment will contain data that is currently being accessed by a master and the other will contain prefetch data where prefetching operations are enabled. The WR_PTR [2] bit, or toggle pointer, defines which cache partition the received data from the MD_DATAIN [31:0] bus is to be written. Bits [1:0] determine which specific DWORD of the addressed cache line is written into the data store 208. The RD PTR[2:0] signals then address data within the data store 208 that is subsequently read by a requesting master over the DL_DATA_OUT [31:0] bus. Bit [2] of the RD_PTR signal specifies which cache line is to be read. Bits [1:0] determine which specific DWORD of the addressed cache line is to be read.

The toggle pointer indicates which of the DWORDs in storage to address. When WR_PTR[2] is active, DWORDs 0, 1, 2 and 3 are addressed. When WR_PTR[2] is not active, DWORDs 4, 5, 6 and 7 are addressed. Thus with the read prefetch disabled, there are two cache lines available to store the demanded data. If read prefetch is enabled, the demand cache line is stored in the cache line partition that is available (i.e. pointed by the toggle pointer). The pointer is then toggled to place the prefetched cache line into the other partition.

As shown, the data store 208 stores a total of two cache lines (32 bytes) of data that has been read from the SDRAM devices 116 over the MD_DATA_IN [31:0] data bus 212. Therefore, four DWORDS are stored in each partition 502 and 504. When the address of a read request matches the cache line address stored in the address store 206 (FIG. 9), the matching data is sent to a requesting master from the data store over the DL_DATA_OUT [31:0] data bus 210. Although the memory data bus 212 and the internal bus 210 is shown as having the same data width for exemplary purposes, it should be understood that incoming and outgoing data buses having different widths may be accommodated using methods known in the art with only minor modifications to the disclosed embodiment.

Figure 6B:
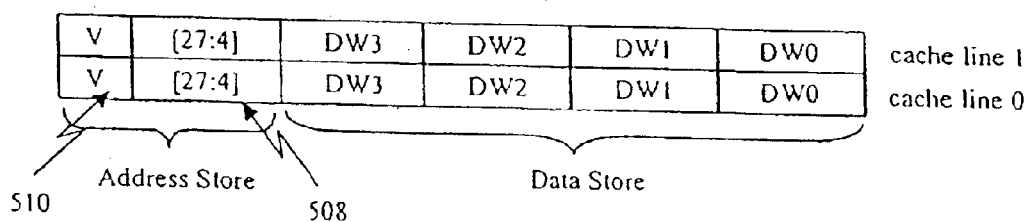
Figure 9:
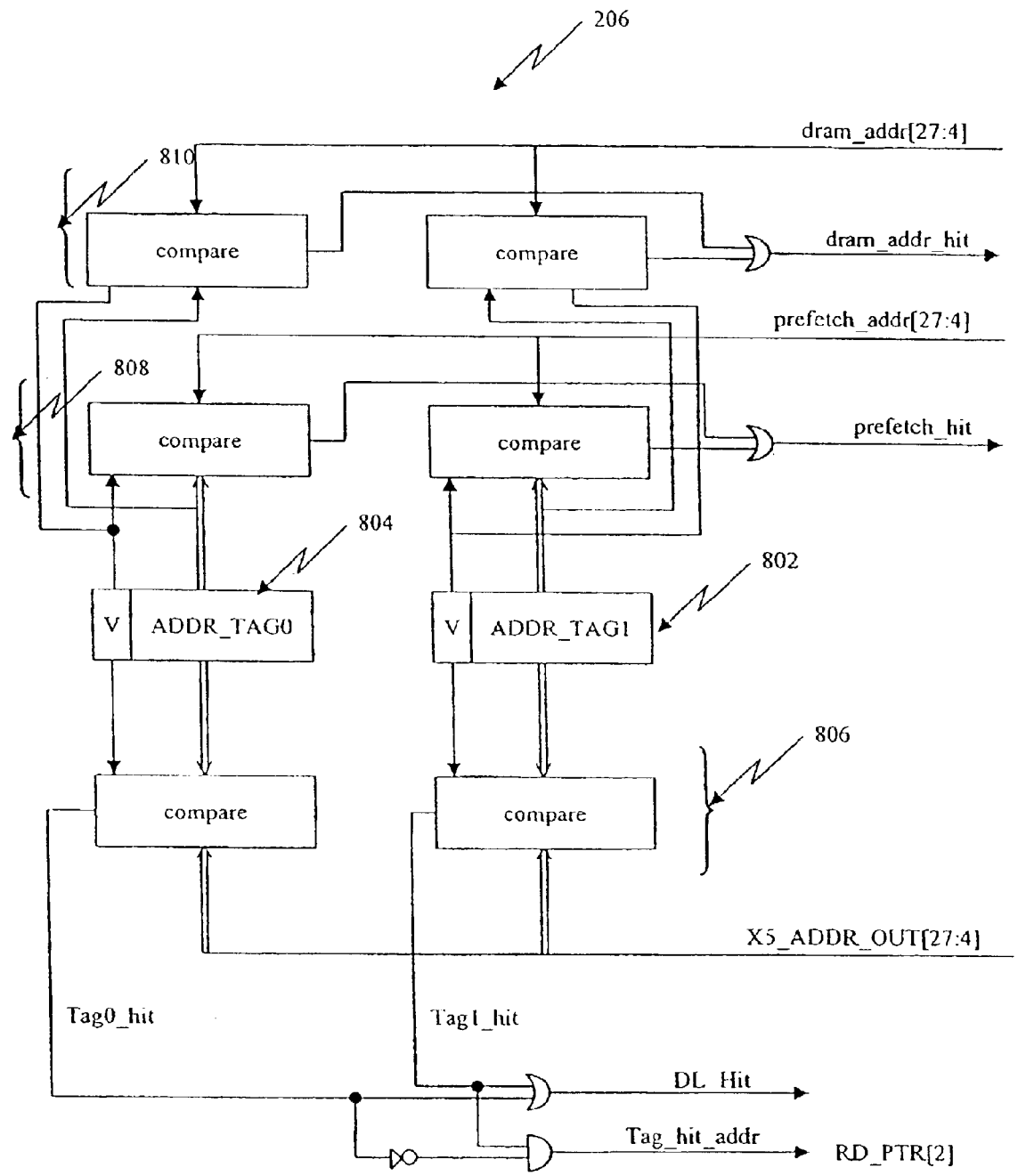
FIG. 9 is a block diagram illustrating in more detail the address store of FIG. 3.

Turning to FIG. 6b, along with each DWORD, a corresponding address tag and a valid bit are stored in the address store 206 (see also FIG. 9). The address tag is taken from the address of the read request to which the data was retrieved. According to an embodiment, the address tag is X5ADDR_OUT[27:4]. Bits [3:0] are unused because the cache line is only 16 bytes. Because a full cache line is always retrieved for any memory read, only one address tag for the entire cache line is required to guarantee that the corresponding DWORDs within the cache line will be present. The valid bit indicates the specific cacheline requested by the requesting master device. The valid bit is also used to invalidate data that is presently stored in the data store 208 but for whatever reason has become outdated, for example a subsequent write to memory at the same address of the data in the data store 208.

Figure 7:
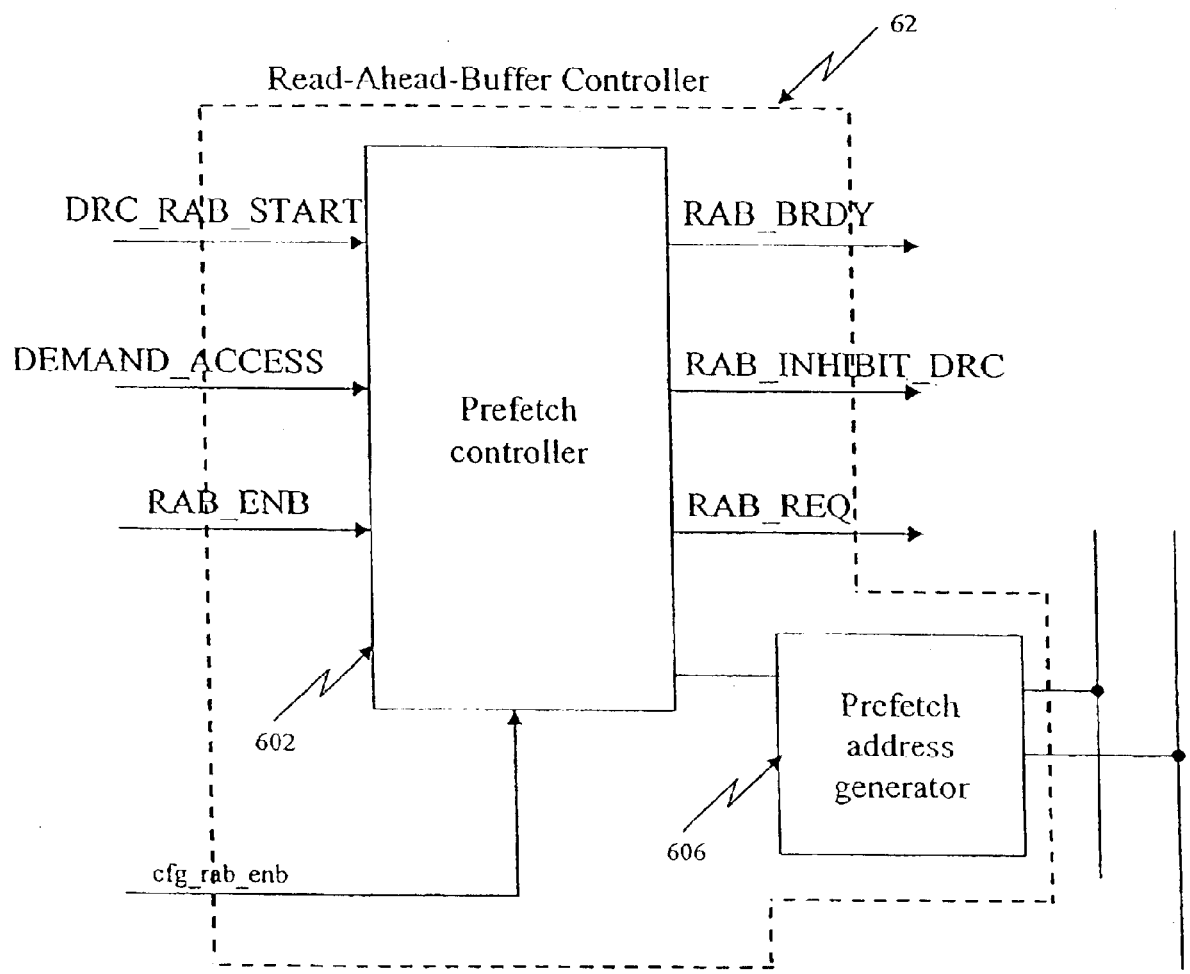
FIG. 7 is a block diagram illustrating in more detail the read ahead buffer of FIG. 3.

Referring now to FIG. 7, shown is a more detailed block diagram of the read ahead buffer controller 62. The read ahead buffer controller 62, according to the disclosed embodiment, includes a prefetch controller 602, and a prefetch address generator 606. The prefetch controller 602 communicates closely with the SDRAM controller 20. When enabled by the CFG_RAB_ENB control signal, the prefetch controller 602 manages the timing of a prefetch operation and requests initiation of prefetch operations where appropriate. Specifically, the prefetch controller 602 requests the SDRAM controller 20 to execute a memory prefetch read access by asserting the RAB_REQ control signal. The SDRAM controller 20 responds by asserting the RAB_DATA_START control signal to the data latch controller 202 to start the prefetch controller's 602 request by asserting the DRC_RAB_START signal. Alternatively, receipt by the prefetch controller 602 of the DEMAND_ACCESS control signal from the SDRAM controller 20 indicates that a regular demand read request and not a prefetch read request is being serviced by the SDRAM controller 20.

The prefetch address generator 606 generates and outputs the correct prefetch read address over the RAB_ADDR_OUT [27:4] bus. The address generated by the prefetch address generator 606 will always be the last read request address incremented by one. One skilled in the art would appreciate a number of ways of implementing the incrementing function of the prefetch address generator 606.

Figure 8:
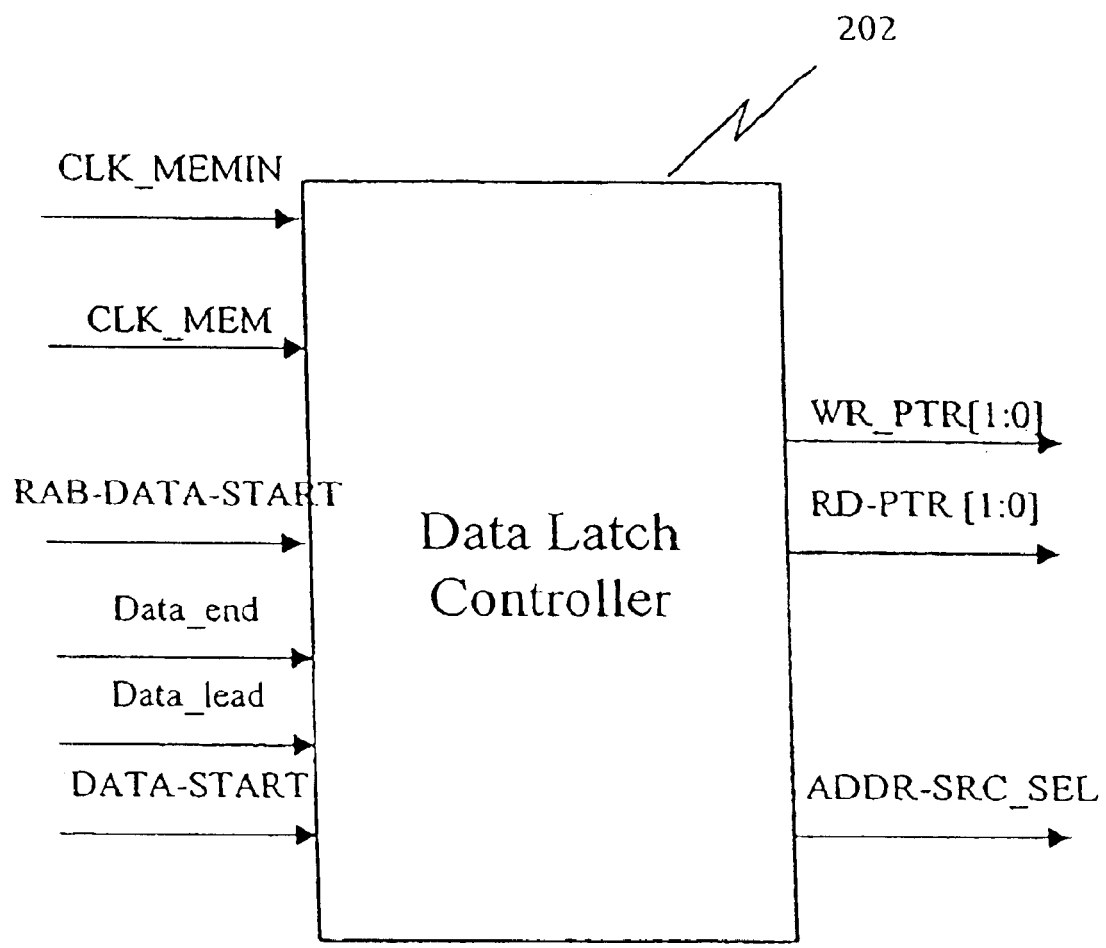
FIG. 8 is a block diagram illustrating in more detail the data latch controller of FIG. 3.

Turning to FIG. 8, a high-level, signal input/output diagram for the data latch controller 202 is shown. The data latch controller 202 manages the address and data store 208 and accesses to them from a requesting master during a read operation. The data latch controller 202 anticipates read data returned from SDRAM upon the detection of either the DATA_START or RAB_DATA_START signals. The latch controller 202 also addresses the data store 208 via the WR_PTR [1:0] control signals, described previously.

As a result of the delays between the different clock operating frequencies, the data latch controller must indirectly determine when a last data in response to a read request is available in order to signal completion of the read cycle to the SDRAM controller 20. a signal from the one clock frequency domain cannot be sampled with logic driven at a different clock frequency domain. Counter logic within the data latch controller 202 tracks the timing of data received in response to a read request to determine completion of the read cycle. A more detailed description of such read cycle clock management can be found in the SDRAM/CPU CLOCK SYNCHRONIZATION SCHEME patent application, previously incorporated by reference.

Turning now to FIG. 9, shown is a more detailed block diagram of the address store 206. The address store 206 includes two address registers. The registers store the cache line addresses for corresponding data that is stored in the data store 208. The address store 206 also contains demand compare logic 806, prefetch compare logic 808 and invalid compare logic 810. The demand compare logic 806 compares either the TAG_ADDR1 address register 802 or the address in the TAG_ADDR0 address register 804 with the next requested data address from the master received on the X5_ADDR_OUT [27:4] address bus. If the demand compare logic 806 detects a match, the dl_hit signal is asserted indicating that the data requested by the read request has already been retrieved and is stored in the data store 208. Likewise, the prefetch compare logic 808 compares either the TAG_ADDR1 address register 802 or the address in the TAG_ADDR0 address register 804 with the next requested data address from the read ahead buffer controller 62 on the PREFETCH_ADDR[27:4] address bus. If the prefetch compare logic 808 detects a match, the prefetch hit signal is asserted indicating that the data requested by the read request has already been retrieved and is stored in the data store 208. For either a demand match or a prefetch match, because the requested data is already present in the data store 208, a read to the SDRAM device 116 is unnecessary and the requested data is provided to the requesting master in reduced wait states. Finally, the invalid compare logic 810 compares either the TAG_ADDR1 address register 802 or the address in the TAG_ADDR0 address register 804 with the data address on the SDRAM_ADDR [27:4] bus. If the invalid compare logic 810 detects a match, the SDRAM_addr_hit signal is asserted. Upon assertion of the SDRAM_addr_hit signal the valid bit of the matching cache line address is reset to invalidate that cache line of data in order to maintain data coherency. This will cause a subsequent read request that matches the address of the invalidated cache line to result in a read to the memory devices directly, opposed to a read of the data store 208.

The address tags 804 and 802 are queried to see if either of the two cache line tags match. If one does, then the address store 206 provides the matching address pointer as RD_PTR[2]. The X5_ADDR_OUT[3:2] bits are used as RD_PTR[1:0]. The dl_hit is asserted high to signal a read buffer hit. If no match occurs, the dl_hit signal is low and the SDRAM controller starts a demand read access. In this way the matching cache line partition in the data store 208 is identified.

Figure 10:
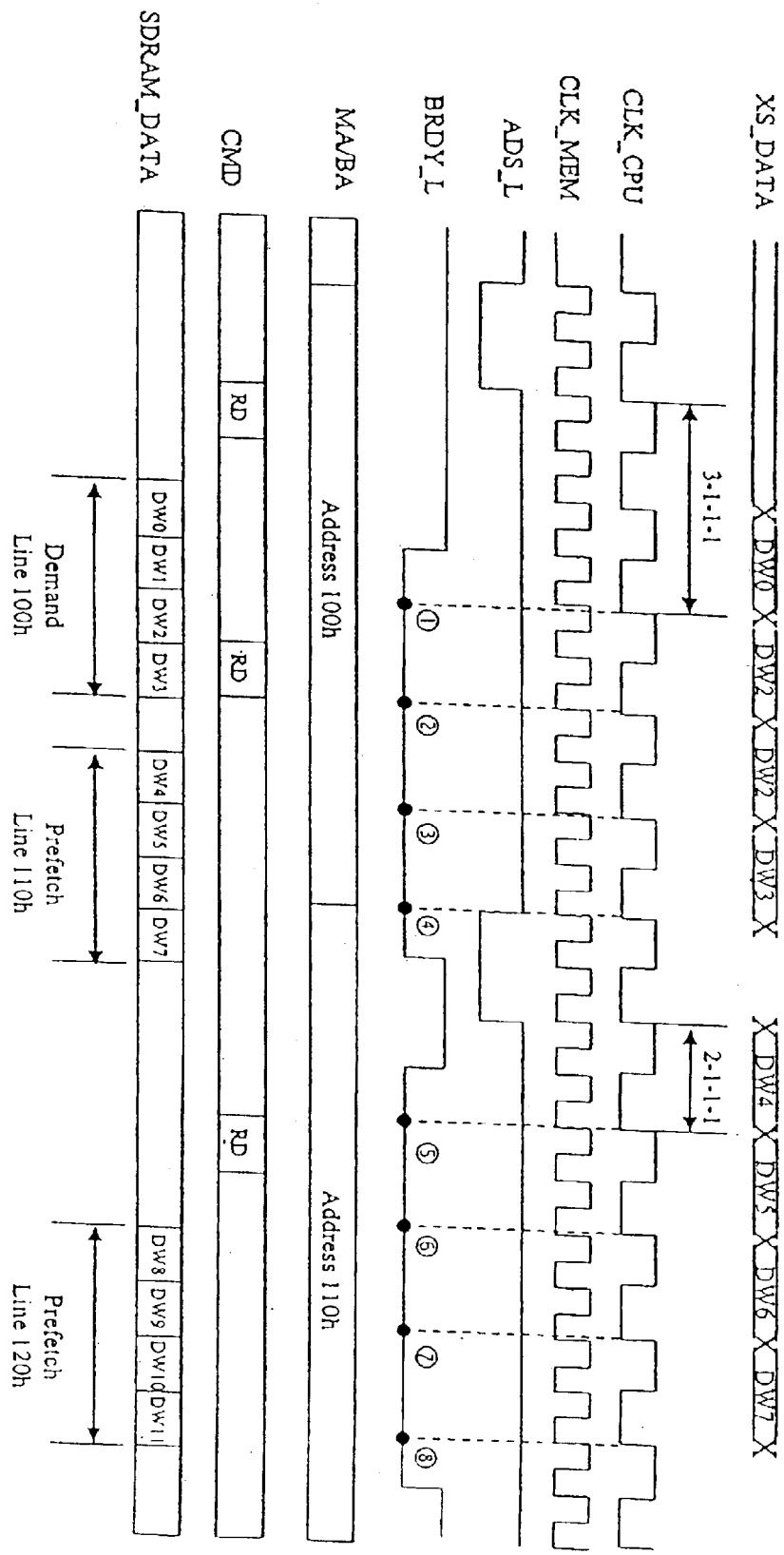
FIG. 10 is a timing diagram illustrating an exemplary memory read scheme for the DRAM controller of FIG. 1.

Turning now to FIG. 10, shown is a timing diagram illustrating a demand and prefetch read operation according to the disclosed embodiment. Beginning with a description of the relevant signals, the CLK_CPU and the CLK_MEM illustrate the different clock frequencies that the CPU or other master device 100 and the SDRAM controller 20 operate, respectively. As shown, the SDRAM controller 20, according to the disclosed embodiment, operates at a frequency twice that of the master frequency. More discussion of the relationship between CLK_CPU and the CLK_MEM clock signals and synchronization of communications between devices operating at different clock frequencies may be found in commonly assigned U.S. Patent Application, entitled "SDRAM/CPU CLOCK SYNCHRONIZATION SCHEME," previously incorporated herein by reference. Proceeding downward through the signal identifiers on the left hand side of FIG. 10, the ADS_L is sent by the requesting master to indicate that an address is present on the address bus. The BRDY_L signal is sent by the SDRAM controller 20 to indicate that requested data is ready to be read by the master device. The MA/BA bus is the address bus over which the address signals for the read requests are transmitted to the SDRAM devices 116. The CMD signal line to the SDRAM devices 116 indicates whether a read or write operation is to occur. Finally, the SDRAM_DATA bus carries the read data from the SDRAM devices 116 in response to the read request.

Turning to the timing considerations shown in FIG. 10, three cache lines of data are subsequently provided over the SDRAM_DATA bus from SDRAM. The first cache line is presented on the SDRAM_DATA bus pursuant to demand request at address 100h while the subsequent two cache lines of data are presented in response to prefetch read requests at address 110h and 120h respectively. Upon the CPU or requesting master asserting the ADS_L signal to indicate the first address of 100H is present on the address bus, a demand read operation is initiated according to the first read signal on the CMD line. The read operation proceeds according to the master read cycle driven by the slower CLK_CPU clock signal. However, once initiated, the SDRAM controller 20 performs its demand read and prefetch read operations according to its faster internal CLK_MEM clock signal. Therefore, upon the assertion of the ADS_L at the rising edge of the CLK_CPU clock signal, the first DWORD is indicated as available to the CPU level at the first rising edge the CLK_CPU clock signal occurring after the assertion, at logic low, of the BRDY_L, indicated at time ①. The three clock cycle delay is due to the latener associated with accessing SDRAM (page hit). Subsequent reads of DWORD1 through DWORD3 occur at zero wait states upon each subsequent rising edge of the CLK_CPU clock signal at times ②, ③, and ④.

A read prefetch operation occurs concurrently while the demand data is read by the requesting master such that response to a subsequent read request for the prefetched data is provided to the requesting master in zero wait states. Normally, without the benefit of the disclosed memory read scheme, a memory controller will wait to respond to a read request until a specific read request has issued. However, for applications where the memory controller is running at a faster frequency than a requesting master, the time between the last retrieved DWORD on the X5_DATA data bus and the next read request indicated by the ADS_L signal sees the SDRAM controller sit idle, waiting for the next master read request. According to the disclosed embodiment, this idle time is utilized by prefetching the next cache line from memory. Specifically the prior address 100h is incremented one cache line to line 110h. Following DW3 on the SDRAM_DATA bus, the prefetched data is presented while the master device catches up through its read of DWORD0 through DWORD3, at times ① through ④. Upon the next issued read request from the master, indicated by the assertion of ADS_L, at logic level low, and after the required set up time for the newly issued address, the address of the prefetched data is checked against the newly issued address. If the newly issued address matches the stored prefetch data, the stored data is provided to the requesting master in zero wait states at times ⑤ through ⑧. It should be understood that the greater increase in performance occur where read requests are to succeeding memory addresses.

Therefore, as in FIG. 10, where the prefetched address of 100h matches the subsequently issued read request address of 110h, the reduced (here zero) wait state performance is achieved. Specifically, DW4–DW7 are returned in zero wait states at times ⑤ through ⑧ because this data was part of a previously prefetched cache line. At the same time, the other cache line of storage, DW8–DW11, is concurrently being filled by the prefetch to address 120h. However, where the prefetched address does not match a subsequently issued read request address the prefetched data will not be read by the requesting device but instead a new demand memory access will occur directly on the memory devices. The next prefetch data occurs after a subsequent read command is issued by the SDRAM controller. If the prefetch address of 120h matches a subsequent, yet-to-be-issued read request address, that prefetched data will be presented after the required address set-up period to a requesting master in reduced wait states. Thus, by prefetching data at times where the SDRAM controller would be otherwise idle as a result of its faster operating frequency in comparison to a requesting master frequency, prefetched data will always be presented in reduced wait states for subsequent read requests that match the prefetched data. In essence, because the SDRAM controller 20 may perform memory access ahead of time during a master read cycle, accessing memory will not require normal delay time within the master read cycle.

Therefore, a microcontroller is provided where read operations are improved between any number of master devices and memory devices. First, a read logic subsystem contains a data store that responds to demand read requests by reading an entire cache line of memory data. Specifically, an entire cache line is written to the data store (upon an SDRAM read) even when less than a full cache line of data is requested. The cache line data is concurrently stored in the data store while the requested data is immediately forwarded to the requesting master. The cache line data is therefore available on subsequent reads by the previous or other masters in zero wait states. In addition, a read ahead buffer is provided to allow retrieval of additional data beyond specific requested data. Specifically, a next cache line, following the previously retrieved cache line, is retrieved from the memory devices in anticipation that subsequent memory requests proceed forward from the original request such that prefetched data may be provided upon a subsequent read request in zero wait states.

The foregoing disclosure and description of the various embodiments are illustrative and explanatory thereof, and various changes in the type of memory, the descriptions of the microcontroller, the SDRAM controller, the read buffer controller, the read buffer, the masters, and other circuitry, the organization of the components, and the order and timing of steps taken, as well as in the details of the illustrated system may be made without departing from the spirit of the invention.

I claim:

1. A microcontroller, comprising:
    a bus;
    a processor, coupled to the bus;
    a non-processor master device, coupled to the bus; and
    a memory controller, coupled to the bus, adapted to store read data and prefetched read data, both accessible to the processor and the non-processor master device,
    wherein the memory controller intermediates accesses from the processor and from the non-processor master device to a memory device directly connected to the memory controller, and
    wherein the memory controller is a DRAM memory controller.

2. The microcontroller of claim 1, the memory controller comprising:
    a data store partitioned into a first data partition and a second data partition interchangeably receiving the read data and the prefetched read data.

3. The microcontroller of claim 1 wherein the memory controller comprises a read ahead buffer controller.

4. The microcontroller of claim 1, wherein the memory controller operates at a higher frequency than the processor.

5. The microcontroller of claim 1, wherein the non-processor master device comprises a peripheral bus master.

6. The microcontroller of claim 1, wherein the non-processor master device comprise a general purpose bus controller.

7. The microcontroller of claim 1, wherein the non-processor master device comprise a direct memory access controller.

8. The microcontroller of claim 1, wherein the non-processor master device is a bus bridge.

9. A method of managing read prefetching with a data store of a memory controller coupled to a bus, the memory controller connected to a memory device, the method comprising:
    coupling a processor and a non-processor master device to the bus;
    intermediating accesses from the processor and the non-processor master device to the memory device via the memory controller;
    storing first read data in a first data partition of the data store accessible to the processor the non-processor master device while storing first prefetched read data in a second data partition of the data store; and
    storing second read data in the second data partition while storing second prefetched read data in the first data partition.

10. The method of claim 9, wherein the memory controller is part of a microcontroller.

11. The method of claim 9, wherein the memory controller operates at a higher frequency than the processor.

12. The method of claim 9, wherein the memory controller comprises a read ahead buffer controller.

13. The method of claim 9, wherein the non-processor master device is a bus bridge.

14. A microcontroller, comprising:
    a processor;
    a non-processor bus master device;
    a memory controller coupled to the processor and the non-processor bus master device and directly coupled to a memory device, the memory controller adapted to store read data and prefetched read data responsive to a request to the memory device from one of the processor and the non-processor bus master device, the stored read data and prefetched read data both accessible to the processor and the non-processor bus master device.

15. The microcontroller of claim 14, wherein the memory controller is a DRAM memory controller.

16. The microcontroller of claim 14, the memory controller comprising:
    a data store, partitioned into a first data partition and a second data partition,
    wherein if the data store stores read data into one of the first data partition and the second data partition, the data store stores prefetched read data into the other of the first data partition and the second data partition.

17. The microcontroller of claim 16, wherein the data store alternates storing the read data into the first data partition and the second data partition.

18. The microcontroller of claim 14, wherein the, memory controller operates at a higher frequency than the processor.

* * * * *